(No Model.)
H. J. GREEN.
CLINICAL THERMOMETER CASE.
No. 432,872. Patented July 22, 1890.
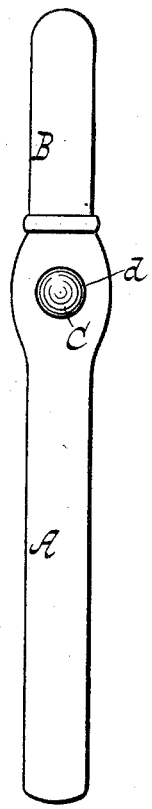
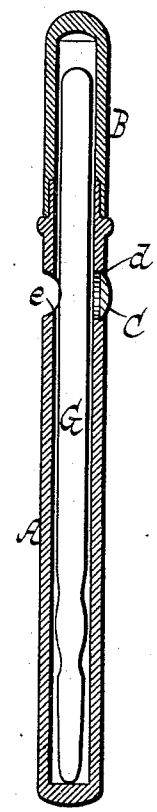
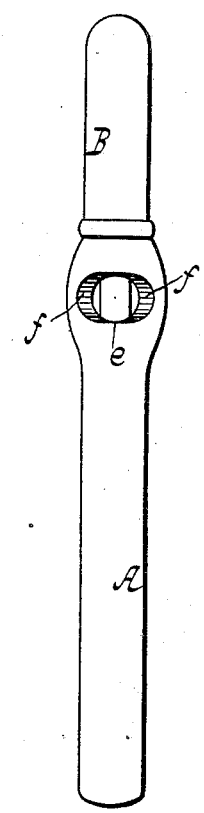
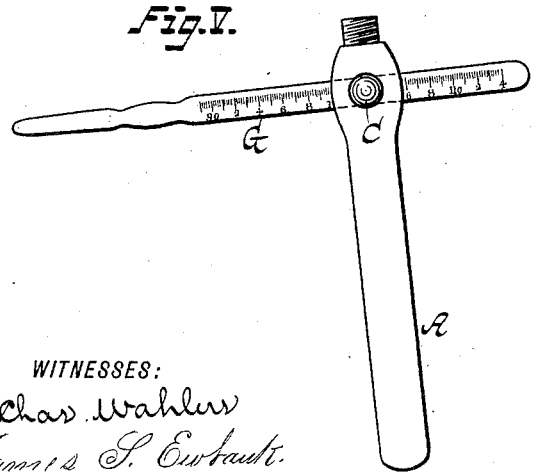
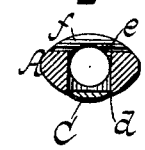
WITNESSES:
Chas. Wahler
James S. Ewbank.
INVENTOR
Henry J Green
BY
Francis C. Bowen
ATTORNEY.

UNITED STATES PATENT OFFICE.

HENRY J. GREEN, OF BROOKLYN, NEW YORK.

CLINICAL THERMOMETER-CASE.

SPECIFICATION forming part of Letters Patent No. 432,872, dated July 22, 1890.

Application filed August 27, 1889. Serial No. 322,137. (No model.)

*To all whom it may concern:*

Be it known that I, HENRY J. GREEN, a citizen of the United States, and a resident of Brooklyn, in the county of Kings and State of New York, have invented certain new and useful Improvements in Clinical Thermometer-Cases, of which the following is a specification.

My invention relates especially to that class of clinical thermometer-cases having a magnifying lens combined therewith, to permit a reading of the thermometer through said lens; and it consists of a certain novel means, hereinafter described, for facilitating the adjustment of the thermometer in relation to the lens.

In the drawings, Figure I represents a longitudinal section of a thermometer-case embodying my invention. Fig. II represents a side view thereof. Fig. III represents a like view thereof looking in an opposite direction to Fig. II. Fig. IV represents a cross-section thereof. Fig. V shows the general position of the thermometer in relation to the case when the lens is applied to use.

Similar letters of reference indicate similar parts.

The letter A indicates the body, and B the top or cover, of the case, the latter having the usual tubular form and being composed of hard rubber or other suitable material.

C indicates a magnifying-lens combined with the case. This lens C is of plano-convex or other suitable form, and is fitted into one of two openings $d$ $e$, which are formed in said body A, diametrically opposite, or nearly so, to each other, permitting a ray of light to pass through the case in the direction of said openings, both openings being round, and usually of a diameter equal to the bore of the case.

The letter $f$ indicates a recess or groove, which is formed on the exterior of said body A at a suitable part thereof to intersect the opening $e$, as more clearly shown in Fig. III, the line of said recess being transverse to the case. That part of the tubular case containing the openings $d$ $e$ is enlarged by making it of an oval shape in cross-section, as shown in Fig. IV, the other or remaining part of the case being round, and by this means I effect two useful purposes—namely, to permit using a lens of comparatively large diameter, and making the recess $f$ of comparatively great length. When the case thus constructed is to be used for reading a thermometer G, the latter is brought into the recess $f$ by taking hold of the case and thermometer each with one hand, and since the thermometer is thereby brought to a point opposite the case-openings it may be easily read through the lens C, due to its exposure to the lens through the opening $e$, and with the effect of magnifying not only the column of fluid, but also the figures and graduations of the thermometer-scale. When the thermometer is brought into said recess $f$, it is supported laterally by the walls of the recess, and hence can be readily adjusted endwise in relation to the lens, since it is only necessary to move the thermometer to and fro in the guideway formed by the recess for presenting the desired part thereof to the lens, the utility of said recess being enhanced by its position on the case causing the thermometer to lie at a right angle thereto.

I am aware that a lens has heretofore been incorporated in a thermometer-case, and I do not claim such, broadly, as my invention.

What I claim as new, and desire to secure by Letters Patent, is—

A tubular thermometer-case having an enlarged part with two openings diametrically opposite each other, a transverse recess exterior thereof intersecting one such opening, and a magnifying-lens fitted in the other opening, substantially as and for the purpose described.

HENRY J. GREEN.

Witnesses:
ALBERT E. GREEN,
FRANCIS C. BOWEN.